(12) United States Patent
Verstreken et al.

(10) Patent No.: US 8,425,112 B2
(45) Date of Patent: Apr. 23, 2013

(54) MEASURING DEVICE

(75) Inventors: Paul Verstreken, Aarschot (BE); Jozef Theodoor Aegten, Bocholt (BE)

(73) Assignee: Heraeus Electro-Nite International N.V., Houthalen (BE)

( * ) Notice: Subject to any disclaimer, the term of this patent is extended or adjusted under 35 U.S.C. 154(b) by 141 days.

(21) Appl. No.: 12/996,633

(22) PCT Filed: May 28, 2009

(86) PCT No.: PCT/EP2009/003792
§ 371 (c)(1),
(2), (4) Date: Dec. 7, 2010

(87) PCT Pub. No.: WO2009/149832
PCT Pub. Date: Dec. 17, 2009

(65) Prior Publication Data
US 2011/0083958 A1     Apr. 14, 2011

(30) Foreign Application Priority Data
Jun. 10, 2008   (DE) .......................... 10 2008 027 505

(51) Int. Cl.
*G01K 1/10*     (2006.01)
*G01K 1/12*     (2006.01)
*C25C 3/08*     (2006.01)
*C25C 3/20*     (2006.01)

(52) U.S. Cl.
USPC ........... 374/139; 374/179; 374/190; 374/194; 374/208; 204/243.1; 204/247.4; 204/247.5; 204/279; 205/372; 205/396

(58) Field of Classification Search ............... 204/243.1, 204/247.4, 247.5, 279; 205/372, 396; 374/139, 374/374/179, 190, 194, 208, E01.016, E01.011, 374/E07.004
See application file for complete search history.

(56) References Cited

U.S. PATENT DOCUMENTS

| | | | | |
|---|---|---|---|---|
| 3,975,212 A | * | 8/1976 | Haupin et al. ................. | 136/232 |
| 4,088,509 A | * | 5/1978 | Blaze, Jr. ....................... | 136/235 |
| 4,124,465 A | | 11/1978 | Schmidt-Hatting et al. | |
| 4,560,448 A | | 12/1985 | Sane et al. | |
| 4,688,949 A | * | 8/1987 | Hatakenaka ................... | 374/183 |

(Continued)

FOREIGN PATENT DOCUMENTS

| | | |
|---|---|---|
| EP | 0973955 B1 | 2/2003 |
| JP | 57091424 A | 6/1982 |
| JP | 57101730 A | 6/1982 |
| WO | 2007110147 A1 | 10/2007 |

OTHER PUBLICATIONS

Office Action issued Aug. 10, 2011 in CN Application No. 200980122032.6.
Int'l Search Report and Written Opinion issued on Sep. 30, 2009 in Int'l Application No. PCT/EP2009/003792.

(Continued)

*Primary Examiner* — Bruce Bell
(74) *Attorney, Agent, or Firm* — Panitch Schwarze Belisario & Nadel LLP

(57) ABSTRACT

A measuring device is provided having a protective cover and a sensor arranged in the protective cover. The protective cover has a carrier tube made of metal and closed on one end. A first coating made of an aluminum non-wettable material is arranged on an outer surface of the carrier tube, and a further coating made of aluminum-wettable material is applied on the first coating.

16 Claims, 3 Drawing Sheets

U.S. PATENT DOCUMENTS

| | | | |
|---|---|---|---|
| 4,977,001 A | 12/1990 | Greenspan | |
| 5,772,324 A * | 6/1998 | Falk | 374/140 |
| 6,402,926 B1 | 6/2002 | Sekhar et al. | |
| 6,645,568 B1 | 11/2003 | Seitz et al. | |
| 2009/0121197 A1 | 5/2009 | Thaler et al. | |

OTHER PUBLICATIONS

Office Action issued on Jan. 22, 2010 in German Appln. Ser. No. 10 2008 027 505.0-24.

* cited by examiner

MEASURING DEVICE

CROSS-REFERENCE TO RELATED APPLICATIONS

This application is a Section 371 of International Application No. PCT/EP2009/003792, filed May 28, 2009, which was published in the German language on Dec. 17, 2009, under International Publication No. WO 2009/149832 A1 and the disclosure of which is incorporated herein by reference.

BACKGROUND OF THE INVENTION

The invention relates to a measuring device having a protective cover and a sensor arranged in the protective cover.

In principle, such measuring devices are known, e.g., from Japanese patent application publication JP 57-101730 or from U.S. Pat. No. 4,124,465. These measuring devices are used for temperature measurements in aluminum melts or cryolite melts. Basically, for measurements in such melts or in other aggressive high-temperature melts, there is the problem that the sensor itself can be attacked by the aggressive melt and must be protected adequately against this melt. In particular, such protection is important for measuring devices that are used for long-term measurement. For such measuring devices it is to be ensured, on the one hand, that the sensor itself comes into adequate contact with the melt to be measured, but also, on other hand, that it is adequately protected.

For temperature sensors as thermocouples, for example, this means that good heat contact must be ensured between the sensor and the melt for simultaneous protection from chemical corrosion, from electrochemical corrosion, and against mechanical damage, which could be caused by temperature shocks when the measuring device is immersed in the melt. Sensors that are designed for use in molten aluminum or molten cryolite must be protected against electrochemical corrosion, which is otherwise generated in the bath by the electric field. Furthermore, cryolite is a relatively chemically aggressive material. The aluminum melt has a strongly reducing effect, so that the measuring device must be protected against reduction. At the same time, protection against oxidation is required, because, for example, the carbon dioxide that is also normally present promotes oxidation of the measuring device.

Such protection must at the same time allow sufficient accuracy of the measurement. For the production of aluminum by electrolysis, the electrodes or the electrolysis cell itself is often protected by titanium boride, as described, for example, in European Patent EP 0 973 955 B1. Additional materials for the protection of electrolysis cells are disclosed in U.S. Pat. Nos. 6,402,926 B1 or 4,560,448. Also, International patent application publication No. WO 2007/110148 A1 describes anti-corrosion protection layers for thermocouple protective tubes, which are used in cryolite melts. Here, a multiphase material, whose main component can be titanium boride, is described.

In practice, it has been proven that coatings made of the known materials do not adequately protect a sensor, in particular a temperature sensor, in order to allow a measurement over a long period, so that the measurement device could be used reliably beyond a single temperature measurement.

BRIEF SUMMARY OF THE INVENTION

The present invention is based on the object of improving the known measurement devices, in particular those for use in salt, cryolite, or aluminum melts, so that a longer use is possible.

The object is achieved according to the invention wherein, for a generic measuring device having a protective cover and a sensor arranged in the protective cover, it has surprisingly proven to be an advantage for continuous use if the protective cover has a multiple-layer construction. The protective cover has a carrier tube closed on one end and is made of metal, in which the sensor is arranged and on whose outer surface a layer is arranged made of a material not wettable by aluminum ("aluminum non-wettable material"), and another layer made of a material wettable by aluminum ("aluminum-wettable material") is applied on this layer. By this multiple-layer structure, which optionally could be supplemented by additional layers, the service life of the protective cover is increased significantly; a service life of more than 24 hr. is achieved.

In particular, liquid aluminum is very aggressive. This cannot penetrate the non-wettable layer, so that the carrier tube having the sensor arranged therein is protected. The wettable layer has the effect that, when the measurement device is used for measurement in aluminum melts, the protective cover is coated with a thin aluminum layer during the passage through the cryolite layer deposited on the aluminum melt, so that cryolite cannot adhere to the measuring device. Therefore, the protective cover is sealed to the outside for protection against oxidation and crack formation due to mechanical stress, as well as against chemical corrosion and also against electrochemical corrosion. Consequently, the carrier tube having the sensor arranged therein, which in particular can be a temperature sensor, as for example a thermocouple, is protected by the liquid aluminum against nearly all damaging effects, except against the reactivity of the aluminum itself.

For protection against aluminum, the aluminum non-wettable coating is used on the carrier tube. The wettable layer is thus practically completely soaked with liquid aluminum, which remains in this layer and cannot penetrate into the underlying layer, so that the aluminum also does not come in contact with the carrier tube. At the same time, the (as perfect as possible) wettability of the layer arranged on the non-wettable layer has the effect that the aluminum layer is renewed practically continuously.

Both coatings can be deposited with the aid of spray methods, for example by plasma injection. An adhesive layer could be arranged underneath the non-wettable layer. The adhesive layer could be made of any suitable, commercially available material, for example of NiCrAlY. This layer could ensure additional protection of the carrier tube against oxidation in the atmosphere.

Preferably, the carrier tube is formed from titanium or martensitic or ferritic stainless steel. The aluminum non-wettable material is formed from one or more oxides, preferably from aluminum oxide or magnesium oxide or a mixture of these oxides. The aluminum non-wettable material is preferably not an ion conductor, that is, an insulator or electron conductor, in order to also protect the carrier tube electrically against the aluminum-wettable coating and against electrochemical effects.

Preferably, the aluminum-wettable material is formed essentially from at least one transition metal boride, wherein preferably one or more borides from the group $TiB_2$, $ZrB_2$, and $HfB_2$ could be used. It is advantageous if the aluminum-wettable material is coated with a metal on its outer surface, wherein this metal could expediently be aluminum. Therefore, the outer aluminum layer required for measurements in molten aluminum is already present upon immersion of the measuring device and does not have to be formed first in the melt itself. This layer liquefies when immersed in the molten aluminum bath or already upon passing through the cryolite layer, fills possibly present micro-cracks or porosities in the aluminum-wettable layer, and thus forms the protective layer described above. The aluminum layer could likewise be applied by spray methods. The individual coatings are each preferably approximately 50 to 1000 μm thick.

The aluminum layer renews itself on the wettable layer practically continuously, because this wettable layer, when it is formed from borides, is itself an electron conductor and produces an electrical contact to the molten aluminum, the cathode in the electrochemical cell. Therefore, the wettable layer itself becomes the cathode, so that aluminum continuously deposits on it electrochemically. This process can be reinforced if the boride coating is connected to the cathode present in electrolysis devices. It is expedient if the protective cover, preferably the interior of the carrier tube, is connected to a cooling-gas source. The cooling-gas source could be a gas bottle. As the cooling gas, in particular, air or an inert gas can be used. Through the gas cooling, around the protective tube, on the boundary surface between the ambient gas and cryolite melt, a melt edge is formed/frozen on the protective tube, wherein this edge prevents its corrosion at this position.

A melting device according to the invention, especially for the production of aluminum, having a melt container, which has at least one busbar and a measuring device according to the invention described above, is characterized in that aluminum-wettable material of the measuring device is connected in an electrically conductive way by a connection cable to at least one busbar. This electrically conductive connection promotes the electrochemical formation of aluminum on the aluminum-wettable material.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
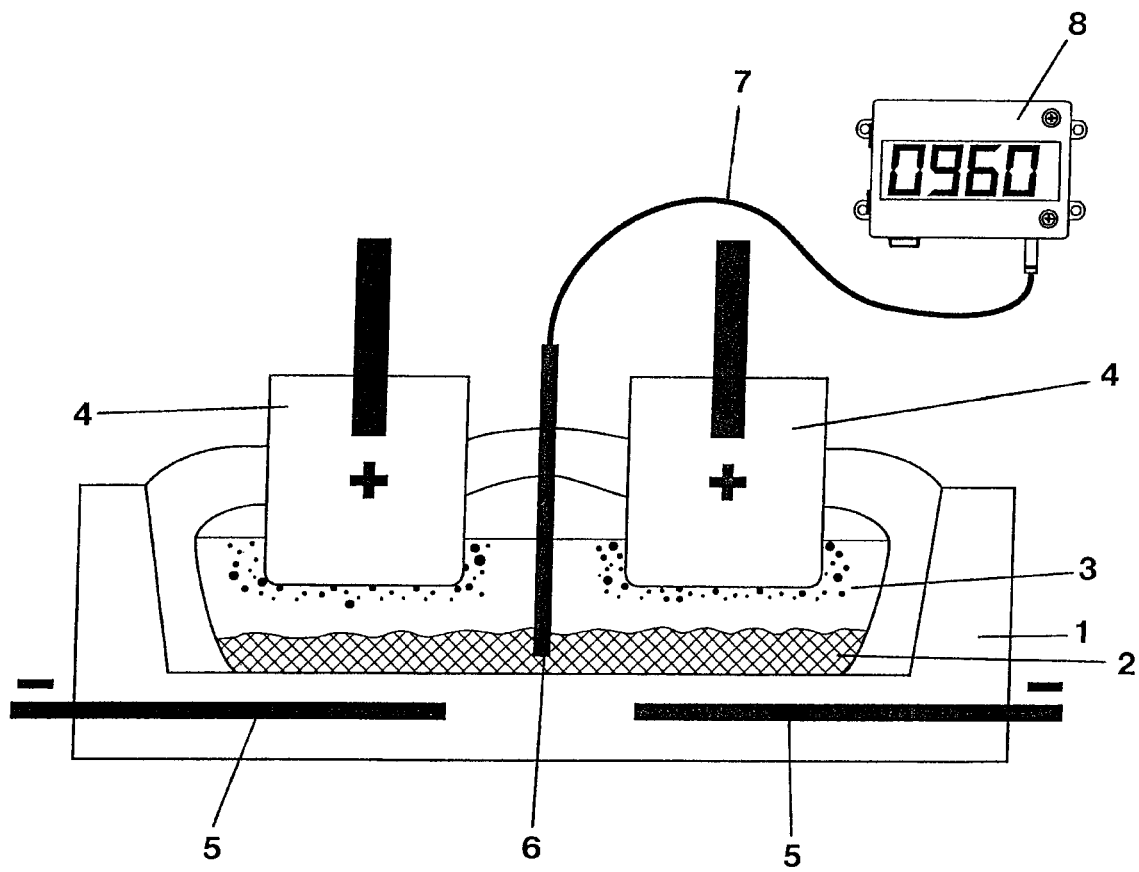
FIG. 1 is a schematic representation of a melt container for aluminum production.

In the melt container 1 of FIG. 1 on the liquid aluminum 2 a cryolite layer 3 is arranged into which the anodes 4 project. The busbars 5 are arranged in the bottom of the melt container 1. Together with the busbars 5 and the aluminum 2, the melt container 1 forms the cathode. The measuring device is formed by a thermocouple arranged in a protective cover 6 and is connected by a cable 7 to a measurement instrument 8. The protective cover 6 of the thermocouple is immersed through the cryolite layer 3 into the aluminum 2, so that it must withstand the influence of both materials. The temperature of the melt lies optimally between 950 and 970° C., but could also decrease to 930° C. or rise to 1000° C.

Figure 3:
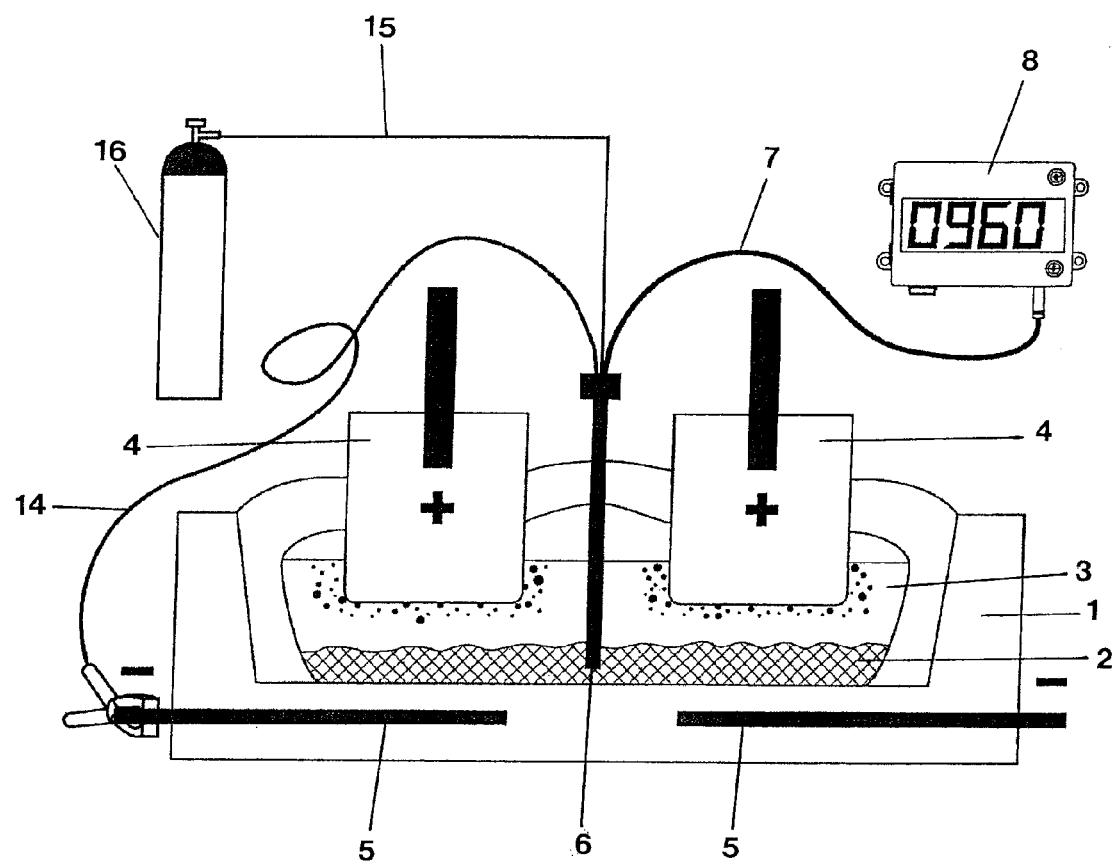
FIG. 3 is a schematic representation of another melt container.

According to the embodiment of FIG. 3, the wettable layer 12 can be connected to the busbar 5 by a connection cable 14.

The interior of the protective cover 6 is connected to a cooling-gas bottle 16 by a gas line 15.

Figure 2:
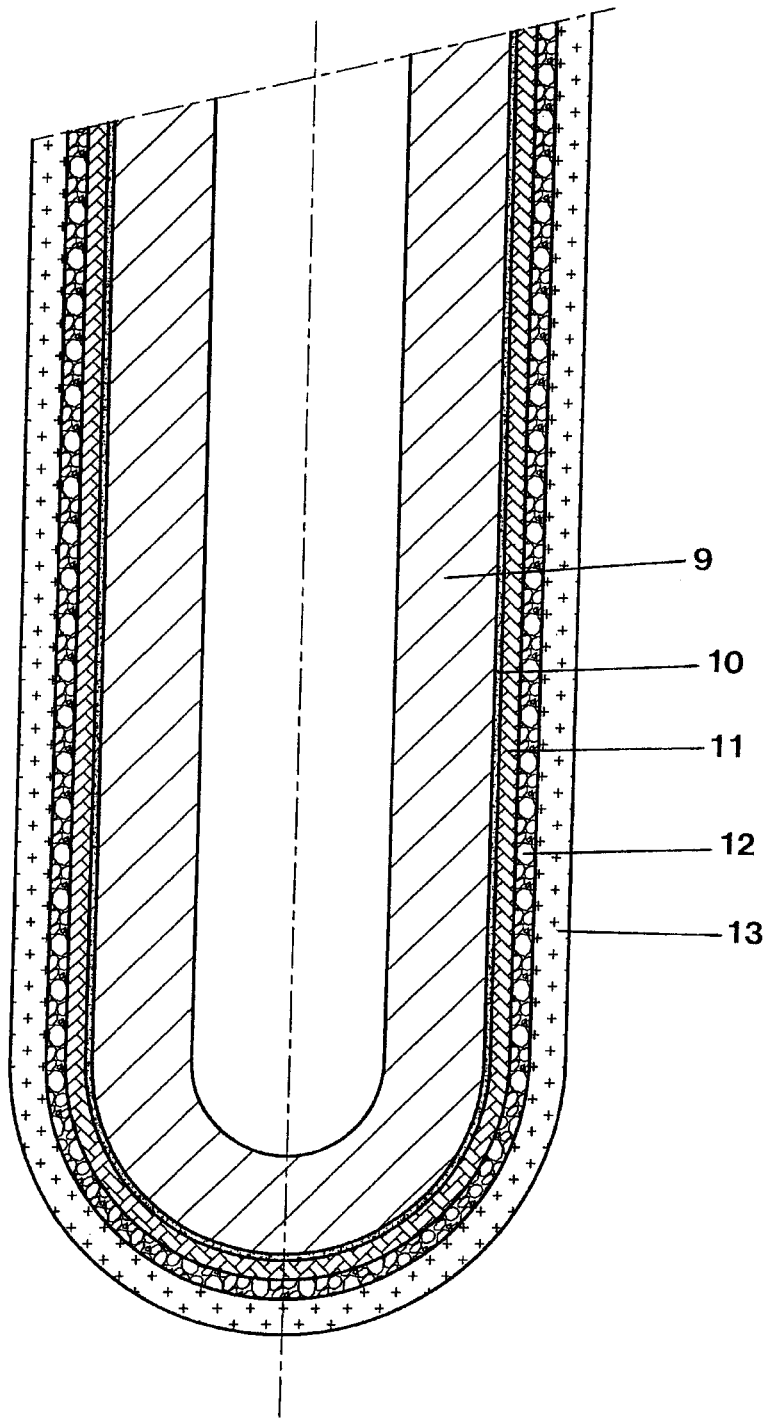
FIG. 2 is a sectional view of a sensor protective cover according to an embodiment of the invention.

The protective cover shown in FIG. 2 for the sensor (not shown) has an inner metal tube 9 made of ferritic or martensitic stainless steel or of titanium. The metal tube 9 has a diameter of approximately 14 mm and a wall thickness of approximately 3 mm. The adhesive layer 10 made of NiCrAlY, arranged on the outer surface of the metal tube 9 closed on one end, has a thickness of approximately 80 μm. The non-wettable layer 11 is arranged on the adhesive layer 10. This is preferably formed from aluminum oxide and has a thickness of approximately 150 μm. The wettable layer 12 arranged thereon is formed from $TiB_2$ and has a thickness of approximately 250 μm. An outer aluminum layer 13 having a thickness of approximately 500 μm is arranged on this wettable layer.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A measuring device comprising a protective cover and a sensor arranged in the protective cover, wherein the protective cover comprises a carrier tube closed on one end and made of metal, wherein a first coating made of an aluminum non-wettable material is arranged on an outer surface of the carrier tube, and wherein a second coating made of an aluminum-wettable material is deposited on the first coating.

2. The measuring device according to claim 1, wherein the sensor is a temperature sensor.

3. The measuring device according to claim 2, wherein the temperature sensor is a thermocouple.

4. The measuring device according to claim 1, wherein the carrier tube is made of titanium or martensitic or ferritic stainless steel.

5. The measuring device according to claim 1, wherein the aluminum non-wettable material comprises essentially at least one oxide.

6. The measuring device according to claim 5, wherein the aluminum non-wettable material comprises essentially aluminum oxide or magnesium oxide or a mixture thereof.

7. The measuring device according to claim 1, wherein the aluminum non-wettable material is an insulator or electron conductor.

8. The measuring device according to claim 1, wherein the aluminum-wettable material comprises essentially at least one transition metal boride.

9. The measuring device according to claim 8, wherein the aluminum-wettable material comprises essentially a boride selected from the group $TiB_2$, $ZrB_2$, $HfB_2$, and mixtures thereof.

10. The measuring device according to claim 1, wherein the aluminum-wettable material is coated with a metal.

11. The measuring device according to claim 10, wherein the aluminum-wettable material is coated with aluminum.

12. The measuring device according to claim 1, wherein each of the coatings has a thickness of 50 to 1000 μm.

13. The measuring device according to claim 1, wherein the protective cover is connected to a cooling-gas source.

14. The measuring device according to claim 1, wherein the cooling-gas source is connected to a interior of the carrier tube.

15. A melting device, particularly for production of aluminum, comprising a melt container having at least one busbar and a measuring device according to claim 1, wherein the aluminum-wettable material of the measuring device is connected by a connection cable in an electrically conductive way to the at least one busbar.

16. A method for measurement in salt, cryolite and/or aluminum melts, wherein the measurement is taken by a measuring device according to claim 1.

\* \* \* \* \*